(12) United States Patent
Fahldieck (10) Patent No.: US 9,731,912 B2
(45) Date of Patent: Aug. 15, 2017

(54) CONTAINER HANDLING ARRANGEMENT FOR HANDLING BEVERAGE CONTAINERS, INCLUDING GLASS BEVERAGE BOTTLES

(71) Applicant: Andreas Fahldieck, Idar-Oberstein (DE)

(72) Inventor: Andreas Fahldieck, Idar-Oberstein (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 15/238,874

(22) Filed: Aug. 17, 2016

(65) Prior Publication Data

US 2016/0355354 A1 Dec. 8, 2016

Related U.S. Application Data

(63) Continuation-in-part of application No. PCT/EP2015/051083, filed on Jan. 21, 2015.

(30) Foreign Application Priority Data

Feb. 17, 2014 (DE) .......................... 10 2014 101 959

(51) Int. Cl.
| | |
|---|---|
| B65G 47/84 | (2006.01) |
| B65G 29/00 | (2006.01) |
| B65G 47/86 | (2006.01) |

(52) U.S. Cl.
CPC ........... *B65G 47/846* (2013.01); *B65G 29/00* (2013.01); *B65G 47/847* (2013.01); *B65G 2201/0244* (2013.01); *B65G 2207/48* (2013.01)

(58) Field of Classification Search
CPC .. B65G 47/846; B65G 29/00; B65G 2207/48; B65G 2201/0244; B65G 47/847; B65G 47/842; B65G 17/323
See application file for complete search history.

(56) References Cited

U.S. PATENT DOCUMENTS

| | | | | |
|---|---|---|---|---|
| 4,075,086 A | * | 2/1978 | Marsh, III | .............. B07C 5/122 |
| | | | | 198/473.1 |
| 5,373,934 A | * | 12/1994 | Jackson | ............... B65G 47/846 |
| | | | | 198/480.1 |

(Continued)

FOREIGN PATENT DOCUMENTS

| | | |
|---|---|---|
| DE | 19523659 C1 | 9/1996 |
| EP | 2172407 A2 | 4/2010 |

(Continued)

*Primary Examiner* — Mark A Deuble
(74) *Attorney, Agent, or Firm* — Nils H. Ljungman & Associates (57) ABSTRACT

A container handling arrangement for handling beverage containers, including glass beverage bottles. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

19 Claims, 4 Drawing Sheets

(56) References Cited

U.S. PATENT DOCUMENTS

| | | | |
|---|---|---|---|
| 5,778,633 A * | 7/1998 | Sweeny | B65B 43/60 53/201 |
| 6,742,647 B2 | 6/2004 | De Greef | |
| 7,497,322 B2 * | 3/2009 | Lanfranchi | B65G 47/848 198/471.1 |
| 9,061,874 B2 * | 6/2015 | Fahldieck | B65G 47/847 |
| 2002/0041801 A1 * | 4/2002 | De Greef | B65G 17/323 414/499 |
| 2005/0082456 A1 * | 4/2005 | Petri | B65G 17/323 248/312 |
| 2007/0164495 A1 * | 7/2007 | Monti | B65G 29/00 269/254 R |
| 2009/0014615 A1 * | 1/2009 | Hausladen | B08B 9/426 248/311.2 |
| 2011/0114454 A1 | 5/2011 | Balzarin et al. | |

FOREIGN PATENT DOCUMENTS

| | | |
|---|---|---|
| EP | 2441717 A1 | 4/2012 |
| JP | 2011041984 A | 3/2011 |
| WO | WO 99/51514 | 10/1999 |
| WO | WO 03/078285 | 9/2003 |

\* cited by examiner

CONTAINER HANDLING ARRANGEMENT FOR HANDLING BEVERAGE CONTAINERS, INCLUDING GLASS BEVERAGE BOTTLES

CONTINUING APPLICATION DATA

This application is a Continuation-In-Part application of International Patent Application No. PCT/EP2015/051082, filed on Jan. 21, 2015, which claims priority from Federal Republic of Germany Patent Application No. 10 2014 101 959.8, filed on Feb. 17, 2014. International Patent Application No. PCT/EP2015/051082 was pending as of the filing date of this application. The United States was an elected state in International Patent Application No. PCT/EP2015/051082.

BACKGROUND

1. Technical Field

The present application relates to a container handling arrangement for handling beverage containers, including glass beverage bottles.

2. Background Information

Background information is for informational purposes only and does not necessarily admit that subsequently mentioned information and publications are prior art.

The present application relates to a container handling arrangement, such as a transport star wheel for transporting containers, comprising a transport compartment or star compartment designed to accommodate and hold or handle a container.

To convey a container, such as a glass or plastic bottle, through a container treatment system, transport star wheels are often used. Star wheels are rotary devices that transport the containers on a circular track or path. For this purpose the transport systems are matched to the respective container type and size.

The term "containers" should be understood hereinafter to mean essentially any kind of packing unit. However, the most common examples of containers relating to the present application include, but are not limited to, beverage containers such as glass bottles, cans, or plastic bottles (such as PET bottles).

During transport, a container coming from a feeding transport element and/or from a container treatment machine is taken up by the transport compartment of the container handling machine or star wheel. In this situation the containers lie on one or more contact points in the compartment. Due to the fact that the transport star wheels are mostly made of metal, such as steel, or already carry decoration elements, there is a risk that the containers or the decoration elements may be damaged or destroyed. In order to allow for gentle transport of the containers, for example of glass containers, a protective body, usually made of a softer material than the steel, is generally screwed to the transport star wheel in the region of the contact point of the container.

Due to the high speed of the containers and the vibrations occurring in the container system, the protective bodies are subject to high mechanical loading. Consequently, it is not uncommon for the protective bodies to be damaged, for example by being split, and/or to experience heavy wear. This makes frequent replacement of individual or all or some protective bodies necessary and/or desired.

OBJECT OR OBJECTS

The present application is therefore based on an object of devising a container handling machine or transport star wheel with one or more protective bodies that can be replaced particularly or relatively rapidly and easily.

SUMMARY

The present application solves the object in a transport star wheel according to the present application. Further exemplifications are provided in the present application. In this situation, the features described, taken alone or in any desired combination, are in principle the object of the present application.

The transport star wheel according to the present application for the conveying of containers comprises a transport compartment for accommodating a container and a container protective cover arranged at the transport compartment, wherein the container protective cover comprises a protective body integrally formed with a connecting element. The transport star wheel can be of a rotary design, with a plurality of transport compartments disposed about the perimeter or periphery of the star wheel.

The integral formation of the protective body with the connecting element for connecting to the transport star wheel allows for a particularly or relatively rapid removal and fitting of the protective body to the transport star wheel. This design allows for the protective body to be replaced rapidly when needed, such as, for example, in the event of the protective body being damaged. In addition to this, due to the integral formation, fitting and removal by hand is possible, such as, in one possible exemplification, without the use of tools.

The expression "integral formation of the connecting element with the protective body" is to be understood to mean that the protective body and the connecting element together comprise one structural body, or were connected or joined to form one structural body before being connected to the transport star wheel. In other words, the protective body and the connecting element are assembled into a unit before assembly, which is in contrast, for example, to a screw for screwing the protective body tight to the connecting element. The connecting element is therefore connected to the protective body in either a detachable manner, for example screwed, or in a non-detachable manner, for example metallurgically or chemically joined.

Accordingly, the container protective cover can comprise an injection molded part, for example of plastic or metal, with which the connecting element and the protective body cannot be detached from one another in a non-destructive manner. The container protective cover can also comprise, for example, a plurality of separate structural bodies, such as, for example, two separate structural bodies, which are welded, adhesively bonded, or also screwed to one another, wherein the connecting element and the protective body connected to each other form one single structural body before attachment to the transport star wheel.

The connection formed by the connecting element between the protective body and the transport star wheel can be, in one possible exemplification, rapidly established and detached again. The connecting element can therefore be formed as a latch or clamp connection. The connection between the protective body and the transport star wheel, according to this exemplification, is therefore provided by the connecting element without a screw, and is not metallurgically joined.

The connecting element is, in one possible exemplification, formed in such a way that the container protective cover is pushed onto it without tools for the connection to the transport star wheel, or arranged at the connecting element and then latched in position by a rotational and/or pivot movement.

The connecting element in this situation forms, in one possible exemplification, a non-positive and/or positive fit connection between the transport compartment and the protective body. In this situation it is possible that, depending on the respective spatial direction, a non-positive, positive, or non-positive and positive connection can be established by the connecting element. For example, in one possible exemplification in which a protective body is pressed on during the assembly, a non-positive connection in the assembly direction is formed, whereas with a protective body which is fitted by means of a rotational movement, a positive fit connection in the assembly direction is formed. It should be understood that the term "positive" as used in this application generally refers to a locking connection between two objects in which the two objects lock together due to the way they are shaped, i.e. a projection in one object engages with a recess in the other, thereby preventing relative motion of the components. The term "positive" can also refer to anchor or restraint-type connections between an item and a hard attachment point, such as a solid wall, braced partition, concrete floor, or built-in countertop. Such "positive" connections generally comprise some combination of screws, bolts, cables, chains, straps, steel angles, and other steel hardware. "Positive" connections do not rely on the frictional resistance produced by the effects of gravity. In contrast, the term "non-positive" as used in this application generally refers to a connection where the two components are held together by friction or a frictional force, such as when two objects are pressed firmly together. A "non-positive" connection may be formed by the frictional resistance between the base of an object and the floor or other support, or by mechanical friction connections such as clamps. Some connections disclosed in this application may be essentially only a locking or anchoring connection that does not rely on friction, and thus would be considered "positive." Some connections disclosed in this application may be essentially only a connection based on friction between two objects without a locking or anchoring engagement, and thus would be considered "non-positive." Some connections disclosed in this application may utilize a combination of locking or anchoring engagement and frictional engagement between two objects, and thus would be considered both "positive" and "non-positive," at least in part.

In at least one possible exemplification, the connecting element forms a non-positive connection in the direction of a longitudinal axis of the protective body, such as a clamp connection. For this purpose, the connecting element forms a positive fit connection in a direction transverse to the longitudinal direction, such as a latch or hook connection. These two types of connection of the connecting element, in at least one possible exemplification, may be used or utilized in combination, since, with a protective body which is integrally connected to the connecting element, a possibly easy and rapid removal and fitting of the container protective cover can be achieved.

The direction of the longitudinal axis can, in this situation, point both from the outside of the transport star wheel in the direction of an inner region of the transport star wheel, for example, in the direction of the transport star wheel midpoint (radial direction of the transport star wheel), as well as in the opposite direction. Accordingly, a direction transverse to the longitudinal axis can also point in the direction of the longitudinal axis or away from it.

A main loading direction of the protective body in operation points, for example, along the longitudinal axis and from the outer edge of the transport star wheel in the direction of a transport star wheel center. It is also possible, for example, during the fitting or removal of the protective body, for the longitudinal axis direction to be a push-on and draw-off direction of the protective body from the transport star wheel.

The expression "transverse to the longitudinal axis" is therefore understood to mean all or substantially all directions not running in the direction of the longitudinal direction (parallel or substantially parallel to the longitudinal axis). The connecting element can therefore be configured in such a way that it forms a blocking connection into a direction transverse to the longitudinal axis or also in a plurality of directions transverse to the longitudinal axis.

The positive fit connection in a direction transverse to the longitudinal axis can therefore be formed in such a way that all or substantially all movement directions of the protective body transverse to the longitudinal axis (i.e. not running in the longitudinal axis direction) are blocked by the connecting element.

According to a further exemplification of the present application, provision is made for a latch device to be arranged for the positive fit connection of the protective body in the longitudinal axis direction. The latch device in this situation can be formed and arranged, as an alternative or supplement to the non-positive connection, in the longitudinal axis direction of the protective body. It essentially guarantees and/or promotes a possibly secure positioning of the protective body at the transport compartment, in order, for example, to prevent, restrict, and/or minimize the slipping of the protective body in the longitudinal axis direction due to strong vibrations or due to impacts of the containers on the container protective cover. In this situation, the latch device blocks a movement of the protective body in one possible exemplification in both directions of the longitudinal axis.

In at least one possible exemplification, the latch device comprises an engagement body and an engagement body receiver. In this situation it is possible, for example, for the engagement body to be arranged on the protective body and the engagement body receiver to be arranged at the transport compartment. As an alternative, however, the engagement body receiver can be arranged at the protective body, and the engagement body at the transport compartment.

The engagement body receiver can be formed as an aperture or projection, for example as a receiver depression, receiver groove, or also by an edge of the transport compartment or of the protective body, while the engagement body is formed, for example, as a spring, cap, indentation, or also as an engagement nose or tab or projection or detent provided so as to engage behind a projection or an edge.

The protective body, in one possible exemplification, exhibits a longitudinal shape, and may accordingly be arranged with its longitudinal axis parallel or substantially parallel to a transport star wheel plane at the transport star wheel. In order to simplify the assembly of such protective bodies and/or to allow for the positioning of the protective body at the transport star wheel to provide additional support for the connecting element, provision is made, according to a further exemplification of the present application, for a positioning device to be arranged which comprises a positioning body formed so as to correspond with a positioning stop.

For this purpose it is possible for the positioning body to be arranged at the transport compartment and for the positioning stop to be arranged at the container protective cover, or the positioning body at the container protective cover and the positioning stop at the transport compartment.

In one possible exemplification for achieving possibly easy fitting of the container protective cover to the transport compartment, the positioning stop can be arranged at a free end of the transport compartment, and the positioning body at a free end of the protective body. In this situation, the positioning stop can be arranged on a surface of the transport compartment which is located opposite a contact surface of the protective body.

The positioning stop and positioning body are, for example, configured and arranged in such a way that, for the installation, first the positioning stop is brought in contact with the positioning body, and then a rotational movement of the protective body is carried out about the contact point, in order to secure the protective body by means of the connecting element to the transport compartment. In at least one possible exemplification, in the installed position, the positioning body engages in this situation around a section of the transport compartment, and is in contact at the positioning stop.

In order for the connection produced by the connecting element between the protective body and the transport compartment to be formed as possibly secure and stable, provision is made, according to a further exemplification of the present application, for a connecting web to be arranged for the secure location positioning of the connecting element. This essentially ensures and/or promotes that the connecting element retains its intended position even under high loading, or also, for example, at the installation of the container protective cover. The connection produced by the connecting element is precisely or substantially precisely or generally formed.

During the operation of the transport star wheel, high forces may take effect on the protective body, for example in the longitudinal direction axis of the protective body, which high forces may be, for example, due to impacts of the containers. In order to achieve a possibly secure positioning and, if possible, an easing of the load on the connecting element, provision is made, according to a further exemplification of the present application, for a stop to be arranged at the transport compartment for the secure location positioning of the protective body.

The stop, in this situation, can be arranged as a projection on the transport compartment, with which the protective body comes in contact with a surface. In this situation, a contact surface of the stop can be formed, such as to correspond to the surface of the protective body.

The orientation of the surfaces in this situation is, in one possible exemplification, at an angle of exactly ninety degrees, essentially ninety degrees, or approximately ninety degrees to the longitudinal axis direction of the protective body. Accordingly, a further positive lock arrangement is formed between the stop and the protective body in contact with the stop, which, for example, in addition to the connecting element, blocks a movement of the protective body in the longitudinal axis direction and away from an outer edge of the transport star wheel in the direction of an inner region of the transport star wheel.

The transport star wheel is configured, in one possible exemplification, for the transport of bottles, such as plastic bottles or glass bottles. The transport star wheel may comprise one or a plurality of transport star wheel planes, with a plurality of transport compartments, i.e., star compartments or star pockets or container pockets, to accommodate the containers. The transport compartments can exhibit a fixed size or be individually adjustable. Thus, for example, with an arrangement of the transport star wheel with transport compartment arms, these arms can be adjusted to one another, such that the diameter of the transport compartment can be individually adjusted. It is therefore possible, for example, for the transport star wheel to be used for different containers with different dimensions.

According to a further exemplification of the present application, provision is made for a container protective cover to be arranged in each case at two container contact points of the transport compartment. The arrangement of protective bodies with an integrally formed connecting element in the region (transport compartment section) of each container contact point allows for a possibly secure transport of the containers with the transport star wheel. It is in this way possible, for example, for a transport star wheel, with mutually adjustable transport arms for changing the transport compartment size, to be equipped easily, in one possible exemplification, with the container protective cover according to the present application.

The material of which the container protective cover is comprised can be selected differently. It is therefore possible, for example, for the covers to be manufactured from a softer metal, such as aluminum, in relation to the transport star wheel. The container protective cover can also comprise, for example, a composite material. According to a further exemplification of the present application, the container protective covers are formed from a plastic.

Container protective covers made of plastic can be manufactured possibly easily and, in one possible exemplification, more economically than container protective covers comprising one single structural body.

The above-discussed exemplifications of the present invention will be described further herein below. When the word "invention" or "exemplification of the invention" is used in this specification, the word "invention" or "exemplification of the invention" includes "inventions" or "exemplifications of the invention", that is the plural of "invention" or "exemplification of the invention". By stating "invention" or "exemplification of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present application is described in greater detail hereinafter on the basis of several exemplifications.

DESCRIPTION OF EXEMPLIFICATION OR EXEMPLIFICATIONS

Figure 1:
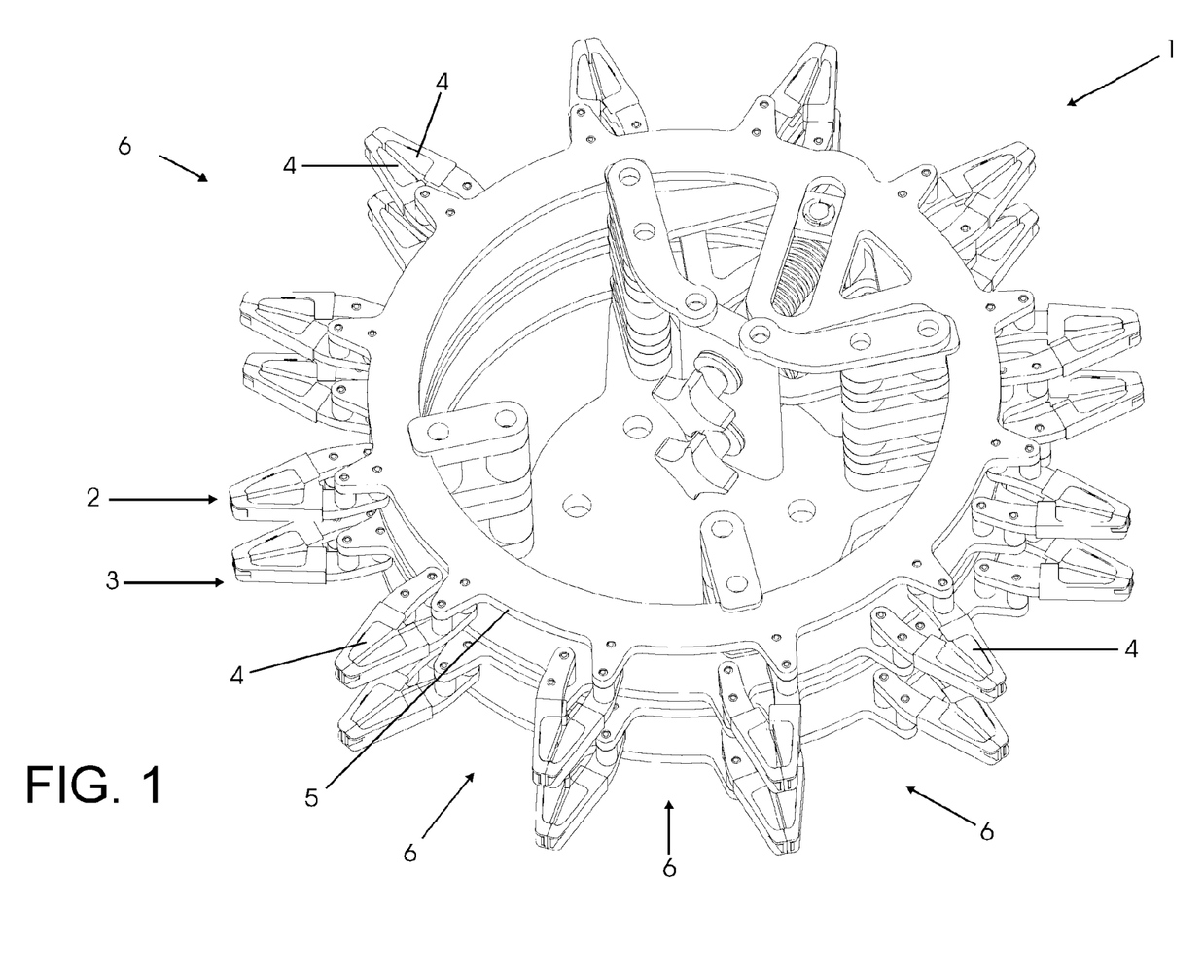
FIG. 1 shows a schematically in perspective representation, a transport star wheel with transport compartments and container protective covers formed from transport compartment arms.

FIG. 1 shows a transport star wheel 1 for the conveying of containers (not represented here), such as, for example, bottles made of glass or plastic. In at least one exemplification, the transport star wheel 1 is in the form of a rotatable or rotary carousel disposed to rotate in a horizontal position about a vertical rotational axis. The transport star wheel comprises an upper container transport plane 2 and a lower container transport plane 3. Arranged in each of the container transport planes 2, 3 are a plurality of transport compartment arms 4. In this situation, two compartment arms 4 together with an external guide section 5 at the transport star wheel 1 form a transport compartment 6. The respective transport compartment arms 4 are adjustable in relation to one another, such that the size of the transport compartment 6 can be adjusted to the size of the container which is to be transported. Not shown are the carrying surfaces and/or carrying plates which are present with all or substantially all the exemplifications, on which the containers stand with one surface. These run either like the transport compartments 6, about the vertical axis of rotation of the transport star wheel 1, or are configured as fixed in position, such that the containers can be pushed such as to slide on them.

Figure 2:
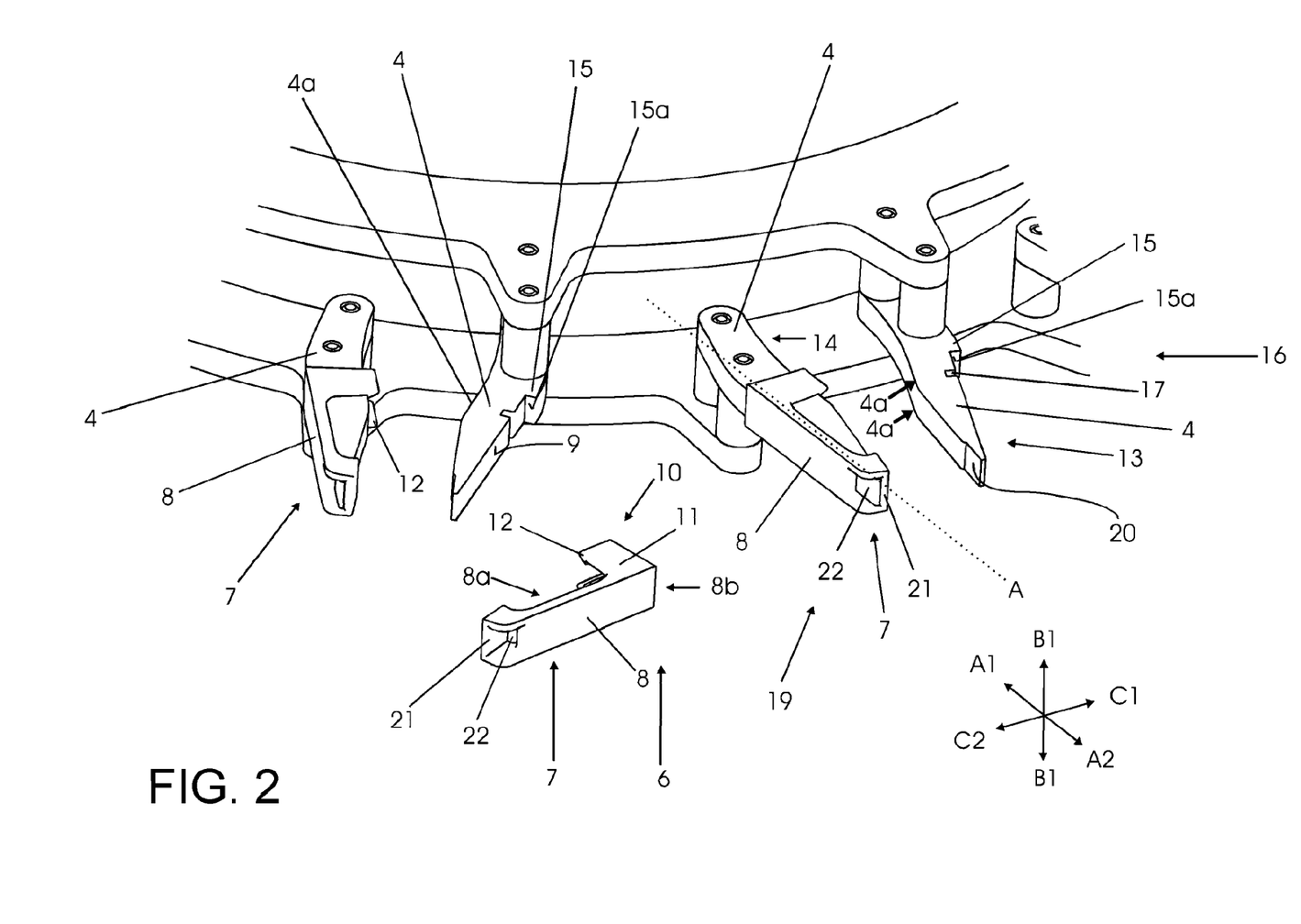
FIG. 2 shows schematically in perspective representation, a section of the transport star wheel from FIG. 1.

FIG. 2 shows a section of the transport star wheel 1 from FIG. 1. Arranged at the transport compartment arms 4 is a container protective cover 7 made of plastic. In this situation, FIG. 2 shows two transport compartment arms 4 with container protective covers 7 already arranged or connected thereto, and two further transport compartment arms 4 with container protective covers 7 not yet arranged or connected thereto.

The container protective cover 7 comprises a protective body 8, which, during the operation of the transport star wheel, is formed and positioned so as to contact with the container being held by said arms 4. The protective body 8 has a contact surface 8a, and the transport compartment arm 4 has a contact surface 9. When the protective body 8 is assembled with or on the transport compartment arm 4, the contact surface 8a is in surface contact with or at the contact surface 9.

The protective body 8 is integrally formed with a connecting element 10. The connecting element 10 comprises two connecting webs 11, arranged parallel or substantially parallel to one another and spaced apart from one another, arranged at the free ends of which an engagement nose 12 is arranged in each case. When installed, one connecting web 11 is disposed above the other. The engagement nose 12 is in the form of a tab, projection, or detent. The connecting web 11 connects the engagement noses 12 to the protective body 8. The engagement noses 12 and the connecting web 11 are configured in such a way that each of the engagement noses 12, in the assembled state, engages in the assembled state behind a corresponding one of edges 4a of the transport compartment arm.

The protective arm 8 can be clipped by means of the connecting element 10 to the transport compartment arms 4. For this purpose, the container protective cover 7 can be pushed onto the transport compartment arm 4, or, by means of a rotational or pivot movement of the container protective cover 7, can be fitted around a free end 13 of the transport compartment arm 4 onto the transport compartment arm 4. For this purpose, among other features, the protective body 8 comprises a receiving opening 22, into which the free end 13 or the positioning stop 20 of the transport compartment arm 4 is introduced during fitting sufficiently far, and then rotated or pivoted, such that the positioning element 21 comes in contact with the positioning stop 20 at the transport compartment arm 4.

The connecting elements 10 are arranged and matched to the transport compartment arm 4 in such a way that, in the mounted state, the connecting elements 10, via the connecting webs 11 in at least one possible exemplification, exert a clamping pressure on the transport compartment arm 4 arranged between them. The clamping pressure prevents, restricts, and/or minimizes a movement of the container protective cover 7 in the longitudinal axis direction A1, A2 (represented by arrows) of the protective body 8, or, according to one possible exemplification, both in the extraction direction A2, i.e., in the direction of the free end 13 of the transport compartment arm 4, as well as in the opposite direction A1, i.e., in the direction of the clamped end 14, i.e., the base end or pivot end or connected end, of the transport compartment arm 4. The connecting elements 10 therefore produce a non-positive connection in the directions A1, A2 (represented here by arrows) of the longitudinal axis A.

As well as the non-positive connection in the longitudinal axis direction A1, A2, the connecting elements additionally produce a positive connection in the direction B1, B2, C1, C2 (represented here by arrows) transverse to the longitudinal axis A. In this situation, the engagement noses 12 engaging behind the edges 4a and the contact surface 8a of the protective body 8, lying on the contact surface 9, produce a positive connection in the direction C1, C2 transverse to the longitudinal axis (and in the transport compartment arm plane), while the connecting webs 11 produce a positive connection in a direction B1, B2 perpendicular or substantially perpendicular to the transport compartment arm plane (and therefore likewise transverse to the longitudinal axis). As an alternative or supplement, a clamping pressure can pertain between the engagement noses 12 and the contact surface 8a lying on the contact surface 8a of the protective body 8, as a result of which the non-positive connection in the direction of the longitudinal axis A is formed or strengthened.

In order to prevent, restrict, and/or minimize a movement of the protective body 8 at the transport compartment arm 4 in the direction A1, A2 of the longitudinal axis A, and in one possible exemplification in the direction of the free end 13, as well as of the clamped end 14, an engagement device 16 or retaining arrangement 16 is additionally located or formed between and/or by the transport compartment arm 4 and the protective body 8.

Figure 3:
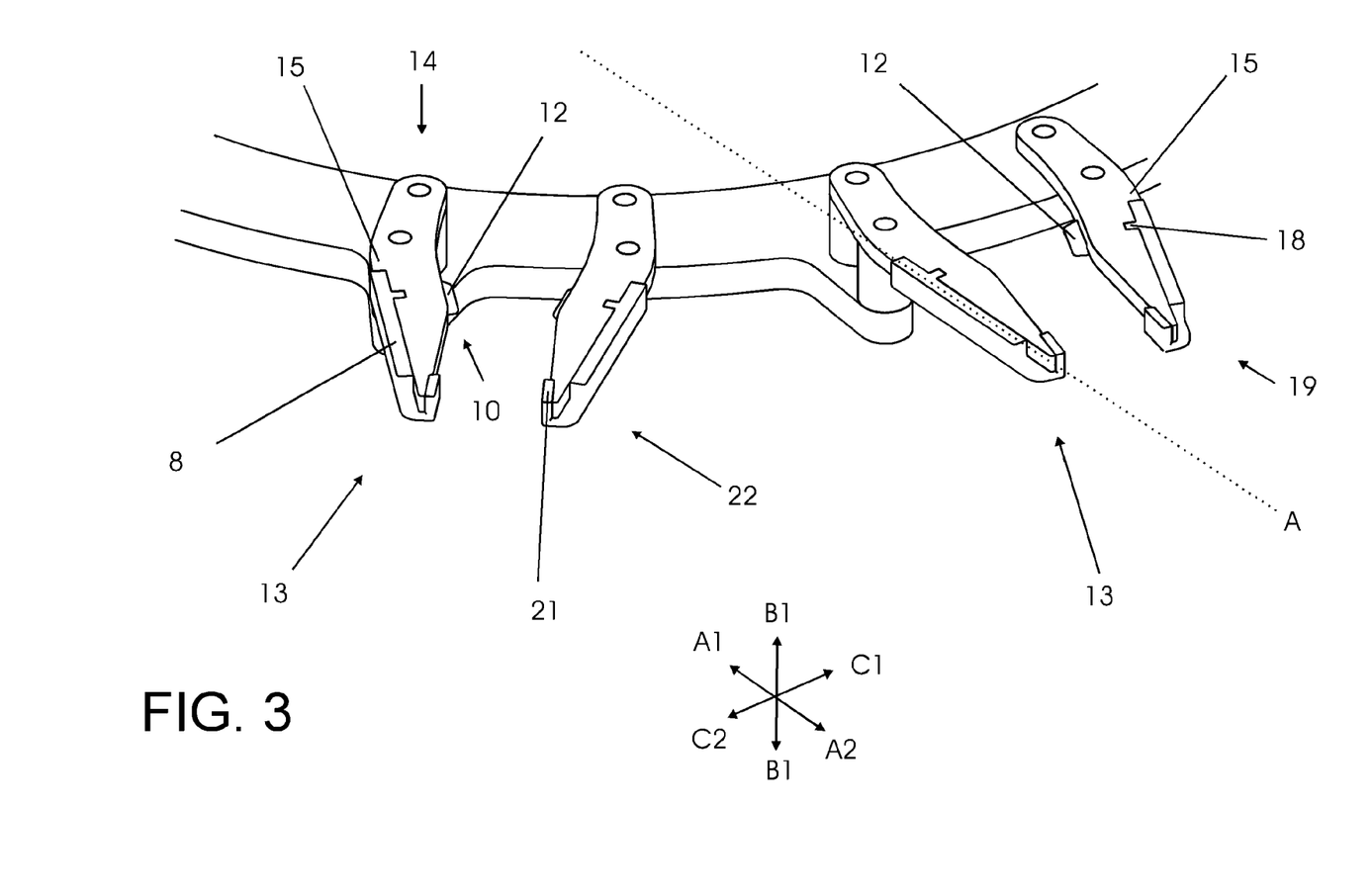
FIG. 3 shows schematically in perspective representation, a horizontal section of a section from FIGS. 1 and 2.

The engagement device 16 comprises at the transport compartment arm 8 an engagement groove 17 and a spring 18, corresponding to the engagement groove 17 and arranged at the protective body 8 (see also FIG. 3). In at least one possible exemplification, the spring 18 may be a projection or tab or detent structure that is integrally formed as part of the protective body 8. In the mounted position, the spring 18 is in engagement with the groove 17, as a result of which, in addition to the non-positive engagement of the connecting element 10, a positive connection is formed in the direction A1, A2 of the longitudinal axis A. That is to say, the engagement device 16 prevents, restricts, and/or minimizes a movement of the container protective cover 7 both in the direction A2 of the free end 13 as well as in the direction A1 of the clamped end 14. The engagement device 16 therefore essentially ensures and/or promotes, in one possible exemplification, an additional protection against extraction of the container protective cover 7 in the direction A2 of the free end 13.

In order to absorb powerful forces which take effect on the protective body 8, a stop 15 is additionally formed at the transport compartment arm 4. The stop 15 is arranged projecting from the free end 13 of the transport compartment arm, as a projection, or is formed as a shoulder, and comprises a contact surface 15a, on which the protective body 8 comes in contact, at least in sections, with its outer surface 8b. The stop 15 forms a positive fit closure between the protective body 8 and the transport compartment arm 4 along the longitudinal axis A in the direction A1 of the clamped end 14.

For possibly easy mounting of the protective body 8 and, at the same time, possibly secure fixing of the protective body 8 on the transport compartment arm 4, a positioning device 19 is formed in the region of the free end 13 of the transport compartment arm 4.

The positioning device 19 comprises, in the region of the free end 13 of the transport compartment arm 4, a positioning stop 20. Additionally arranged at the protective body 8 is a positioning element 21, formed such as to engage into the positioning stop 20.

The positioning element 21, corresponding to the connecting element 10, is integrally formed with the protective body 8, and likewise produces a positive connection between the protective body 8 and the transport compartment arm 4 in the region of the free end 13 in the direction C1, C2 of the transport compartment arm plane transverse to the longitudinal axis.

In order to facilitate the mounting of the protective body 8, the positioning device 19 further comprises an opening 22, into which the free end 13 is introduced during mounting sufficiently far for the positioning element 21 to come in contact with the positioning stop 20 at the transport compartment arm 4. As soon as the contact pertains between the positioning stop 20 and the positioning element 21, the protective body 8 is rotated by a rotational movement about the contact point (positioning stop), such that the connecting element 10 is clipped over the transport compartment arm 4, i.e. due to a flexural tension present, the engagement noses 12 snap to behind an edge 4a of the transport compartment arm 4.

Figure 4:
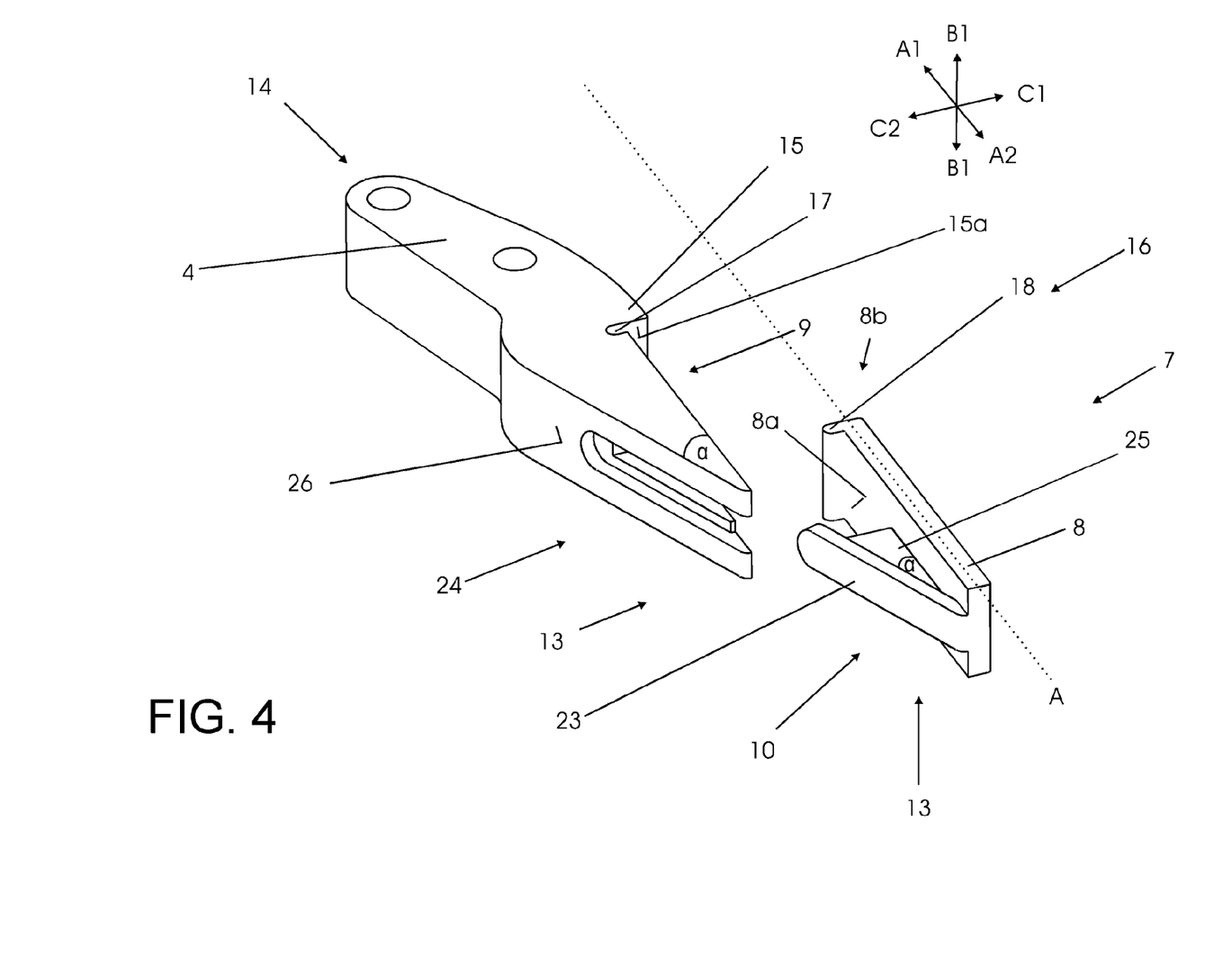
FIG. 4 shows an alternative exemplification of a transport compartment arm with container protective cover.

FIG. 4 shows an alternative exemplification of the container protective cover 7 and of the transport compartment arm 4. The container protective cover 7 comprises a protective body 8 and a connecting element 10. The connecting element 10 and the protective body 8 comprise plastic and are integrally formed from one structural body, and therefore cannot be separated from one another without destroying the structural body.

As an alternative, the connecting element 10 and the protective body 8 can also be configured as separate structural bodies, which are connected to one another in a detachable or non-detachable manner. It would therefore be possible (also with the exemplification from FIGS. 1-3), for example, for the connecting element 10 to be arranged at the protective body 8 by means of a connecting structure, such as a plug system or, for example, also by means of screws or other similar connecting structures.

The protective body 8 represented in FIG. 4 can be pushed onto the transport compartment arm 4. For this purpose the connecting element 10 comprises a clamping strip 23, which is configured for engagement into a strip guide 24 on the transport compartment arm 4.

In this situation, the clamping strip 23 and the protective body 8 are arranged in relation to one another in such a way that, after the protective body 8 has been pushed on along the longitudinal axis A (represented here by a broken line) in the direction A1 to the clamped end 14, a clamping tension pertains or exists or is created between the clamping strip 23 and the contact surface 8a, which blocks the drawing off or removal of the protective body 8 from the transport compartment arm 4 in the direction A2 of the free end 13. That is to say, a non-positive connection is formed between the connecting element 10 and the protective body 8 in the direction A1, A2 of the longitudinal axis A. In order to provide, in one possible exemplification, positional securing of the clamping strip 23, a connecting web 25 is additionally arranged between the protective body 8 and the clamping strip 23. As an alternative or supplement, the clamping strip 23 and the strip guide 24 can also be configured in such a way that a clamping tension pertains between them.

In addition to the non-positive connection, an engagement device 16 is formed between the transport compartment arm 4 and the protective body 8. This comprises a spring 18 formed at the protective body 8, and an engagement groove 17 corresponding to this, arranged at the transport compartment arm 4. In the mounted position or state, the engagement groove 17 and the spring 18 are in engagement, and therefore an additional positive connection (in the longitudinal axis direction) between the protective body 8 and the transport compartment arm 4 is formed. As a result of this, on the one hand the extraction of the protective body 8 is prevented, restricted, and/or minimized, i.e., a movement along the longitudinal axis of the protective body 8 in the direction A2 of the free end 13, or a movement along the longitudinal axis A in the direction A1 of the tensioned end 14.

Corresponding to the exemplification from FIGS. 1-3, with this alternative exemplification from FIG. 4 a stop 15 formed as a projection is also arranged at the transport compartment arm 4. In the mounted state, the protective body 8 is in contact via the outer surface 8a with the contact surface 15a of the stop 15, as a result of which a positive fit connection pertains between the protective body 8 and the transport compartment arm 4 in the direction A1 of the tensioned end 14.

The strip guide 24 is additionally let into or recessed below a surface 26 of the transport compartment arm 4, such that the clamping strip 23 positioned in the strip guide 4 closes with flush surface against the surface 26 of the transport compartment arm 4. The strip guide 24 and the clamping strip 23 consequently form a positive fit connection, such that, in the mounted state, a movement in the direction (B1, B2) is blocked transverse to the longitudinal axis and/or a direction (C1, C2) perpendicular or substantially perpendicular to the transport arm plane.

Both the exemplification from FIGS. 1-3 as well as the exemplification from FIG. 4 of the container transport cover allow for a possibly rapid replacement of the protective body 8, in one possible exemplification without tools, with a secure connection, without screws, between the protective body and the transport arm.

With the first alternative of the container protective cover 7 from FIGS. 1-3, for disassembly the connecting webs 11 are bent sufficiently far apart from one another that the engagement noses 12 no longer have any contact with the edge 4a of the transport compartment arm 4. As a result, the container protective cover 7 can be removed from the transport container arm 4 by a slight rotational movement or an extraction movement.

A new container protective cover 7 is fitted accordingly, in that the free end 13 of the transport compartment arm 4 is guided sufficiently far through the opening 22 of the positioning device that the positioning element 21 at the protective body 8 is in engagement with the positioning stop 20 at the transport compartment arm 4. Accordingly, a rotational movement results in a pushing movement of the protective body 8, such that the connecting webs 11 are guided (in each case above and below) the transport compartment arm 4, and the engagement noses 12 engage (snap to) behind the edge 4a.

A replacement of the container protective cover 7 according to the exemplification from FIG. 4 takes place in such a way that the spring 18 is lifted manually from the engagement groove 17, and the protective body is then drawn off the transport compartment arm 4 in the extraction direction (A2, in the longitudinal axis direction in the direction of the free end 13).

To fit a new container protective cover 7, the new container protective cover 7 is pushed into the strip guide 24, with the clamping strip 23 in the direction of the clamped end 14, until the spring 18 springs into the engagement groove 17, i.e. is in engagement with the engagement groove 17.

The present application relates to a transport star wheel for transporting containers, comprising a transport compartment accommodating a container and a container protective cover 7 arranged on the transport compartment. In order to devise a transport star wheel having a container protective cover that can be exchanged in one possible exemplification rapidly, the container protective cover, in the region of the transport compartment arms 4, has a protective body 8 that is integrally formed with a connecting element 10.

One feature or aspect of an exemplification is believed at the time of the filing of this patent application to possibly reside broadly in a transport star wheel for the conveying of containers, with a plurality of transport compartments 6 for accommodating a container each, comprising transport compartment arms 4, and a container protective cover 7 arranged at the transport compartments 6, wherein the container protective covers 7 are arranged at the transport compartment arms 4 and comprise a protective body 8 integrally formed with a connecting element 8.

Another feature or aspect of an exemplification is believed at the time of the filing of this patent application to possibly reside broadly in the transport star wheel, wherein the connecting element 10 forms a non-positive and/or positive fit connection between the transport compartment 6 and the protective body 8.

Yet another feature or aspect of an exemplification is believed at the time of the filing of this patent application to possibly reside broadly in the transport star wheel, wherein the positive connection is formed in a direction transverse to the longitudinal axis A of the protective body 8.

Still another feature or aspect of an exemplification is believed at the time of the filing of this patent application to possibly reside broadly in the transport star wheel, wherein the non-positive connection is formed in the longitudinal axis direction of the protective body 8.

A further feature or aspect of an exemplification is believed at the time of the filing of this patent application to possibly reside broadly in the transport star wheel, wherein an engagement device 16 for the positive connection of the protective body 8 is arranged in the longitudinal axis direction.

Another feature or aspect of an exemplification is believed at the time of the filing of this patent application to possibly reside broadly in the transport star wheel, wherein the engagement device 16 comprises an engagement body and an engagement body receiver.

Yet another feature or aspect of an exemplification is believed at the time of the filing of this patent application to possibly reside broadly in the transport star wheel, comprising a positioning device 19, which comprises a positioning stop formed such as to correspond to a positioning body.

Still another feature or aspect of an exemplification is believed at the time of the filing of this patent application to possibly reside broadly in the transport star wheel, wherein a connecting web 25 is arranged for the secure location positioning of the connecting element 10.

A further feature or aspect of an exemplification is believed at the time of the filing of this patent application to possibly reside broadly in the transport star wheel, comprising a stop 15 arranged at the transport compartment 6 for the secure location positioning of the protective body 8 at the transport compartment 6.

Another feature or aspect of an exemplification is believed at the time of the filing of this patent application to possibly reside broadly in the transport star wheel, wherein two container protective covers are arranged at the transport compartment 6.

Yet another feature or aspect of an exemplification is believed at the time of the filing of this patent application to possibly reside broadly in the transport star wheel, wherein the protective body 8 is formed from plastic.

One feature or aspect of an exemplification is believed at the time of the filing of this patent application to possibly reside broadly in a rotary container handling arrangement for handling containers, such as glass bottles, plastic bottles, and cans, said rotary container handling arrangement comprising: a rotatable carousel configured to rotate about a vertical axis; a plurality of transport compartments being disposed about the periphery of said rotatable carousel, each configured to receive a container therein; each of said transport compartments comprising transport compartment arms configured to hold a container therebetween; protective covers being removably connected to said transport compartment arms; each of said protective covers comprising a protective body configured to cover a container contact portion of said transport compartment arms to protect containers held by said transport compartment arms from damage caused by contact with said transport compartment arms; each of said protective covers comprising at least one connecting element being configured to removably connect said protective covers to said transport compartment arms; and said at least one connecting element being integrally formed as a one-piece structure with said protective body.

One feature or aspect of an exemplification is believed at the time of the filing of this patent application to possibly reside broadly in a method of protecting containers, such as glass bottles, plastic bottles, and cans, in a rotary container handling arrangement for handling containers, said method comprising: moving containers into transport compartments of a rotatable carousel; holding containers between transport compartment arms of said transport compartments while rotating said rotatable carousel; protecting containers held by said transport compartment arms from damage, caused by contact with said transport compartment arms, using protective covers removably connected to said transport compartment arms; removing worn or damaged protective covers without using tools by disconnecting from each transport compartment arm at least one connecting element integrally formed as a one-piece structure with said protective body; and replacing said worn or damaged protective covers with new protective covers without using tools by connecting said at least one connecting element of each of said new protective covers to a corresponding transport compartment arm.

Another feature or aspect of an exemplification is believed at the time of the filing of this patent application to possibly reside broadly in a the method, wherein said step of connecting said protective covers comprises sliding an opening in said protective cover over a free end of said transport compartment arm, and then rotating or pivoting said protective cover about said free end, and then pushing said at least one connecting element into engagement with a base end of said transport compartment arm.

The components disclosed in the patents, patent applications, patent publications, and other documents disclosed or incorporated by reference herein, may possibly be used in possible exemplifications of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible exemplification of the present application . . . " may possibly not be used or useable in any one or more exemplifications of the application.

The sentence immediately above relates to patents, patent applications, patent publications, and other documents either incorporated by reference or not incorporated by reference.

All of the patents, patent applications, patent publications, and other documents, except for the exceptions indicated herein, which were cited in the German Office Action dated Jul. 21, 2014, and/or cited elsewhere, as well as the German Office Action document itself, are hereby incorporated by reference as if set forth in their entirety herein except for the exceptions indicated herein, as follows: WO 03/078285, having the title "A GRIPPING DEVICE FOR BOTTLES AND SIMILAR", and published on Sep. 25, 2003; and U.S. Pat. No. 6,742,647, having the title "Apparatus and method for conveying and/or transferring fruits", and issued on Jun. 1, 2004.

All of the patents, patent applications, patent publications, and other documents, except for the exceptions indicated herein, which were cited in the International Search Report dated Apr. 13, 2015, and/or cited elsewhere, as well as the International Search Report document itself, are hereby incorporated by reference as if set forth in their entirety herein except for the exceptions indicated herein, as follows: WO 99/51514, having the title "ADJUSTABLE GRIPPER FOR CONTAINERS, IN PARTICULAR FOR A STAR CONVEYOR", and published on Oct. 14, 1999; EP 2 172 407 A2, having the title "Clamping tongue of a gripper and clamp element for attaching to the tongue, and gripper with such a clamping tongue and such a clamp element", and published on Apr. 7, 2010; EP 2 441 717, having the title "Method for operating a transport device and transport device for implementing the method", and published on Apr. 18, 2012; and JP 2011 041984 A, having the title "LINK CLAMP", and published on Mar. 3, 2011.

The corresponding foreign and international patent publication applications, namely, Federal Republic of Germany Patent Application No. 10 2014 101 959.8, filed on Feb. 17, 2014, having inventor Andreas FAHLDIECK, and DE-OS 10 2014 101 959.8 and DE-PS 10 2014 101 959.8, and International Application No. PCT/EP2015/051083, filed on Jan. 21, 2015, having WIPO Publication No. WO 2015/121031 and inventor Andreas FAHLDIECK, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications, patent publications, and other documents, except for the exceptions indicated herein, are hereby incorporated by reference as if set forth in their entirety herein except for the exceptions indicated herein.

The purpose of incorporating the corresponding foreign equivalent patent application(s), that is, PCT/EP2015/051083 and German Patent Application 10 2014 101 959.8, is solely for the purposes of providing a basis of correction of any wording in the pages of the present application, which may have been mistranslated or misinterpreted by the translator, and to provide additional information relating to technical features of one or more exemplifications, which information may not be completely disclosed in the wording in the pages of this application.

Statements made in the original foreign patent applications PCT/EP2015/051083 and DE 10 2014 101 959.8 from which this patent application claims priority which do not have to do with the correction of the translation in this patent application are not to be included in this patent application in the incorporation by reference.

Any statements about admissions of prior art in the original foreign patent applications PCT/EP2015/051083 and DE 10 2014 101 959.8 are not to be included in this patent application in the incorporation by reference, since the laws relating to prior art in non-U.S. Patent Offices and courts may be substantially different from the Patent Laws of the United States.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the exemplifications therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more exemplifications of the patents, patent applications, patent publications, and other documents, are not considered to be incorporated by reference herein for any of the patents, patent applications, patent publications, and other documents cited herein.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The exemplifications of the invention described herein above in the context of the preferred exemplifications are not to be taken as limiting the exemplifications of the invention to all of the provided details thereof, since modifications and variations thereof may be made without departing from the spirit and scope of the exemplifications of the invention.

AT LEAST PARTIAL LIST OF NOMENCLATURE

1 Transport star wheel
2 Container transport plane top
3 Container transport plane bottom
4 Transport compartment arm
4a Edge of transport compartment arm
5 External guide section
6 Transport compartment
7 Container protective cover
8 Protective body
8a Contact surface
8b Outer surface
9 Contact surface
10 Connecting element
11 Connecting web
12 Engagement nose
13 Free end
14 Clamped end
15 Stop
15a Contact surface of stop
16 Engagement device
17 Engagement groove 18 Engagement spring
19 Positioning device
20 Positioning stop
21 Positioning element
22 Opening
23 Clamping strip
24 Strip guide
25 Connecting web
26 Surface of transport compartment arm

What is claimed is:

1. A rotary container handling arrangement for handling containers, comprising glass bottles, plastic bottles, and cans, said rotary container handling arrangement comprising:
   a rotatable carousel configured to rotate about a vertical axis;
   a plurality of transport compartments being disposed about the periphery of said rotatable carousel, each configured to receive a container therein;
   each of said transport compartments comprising transport compartment arms configured to hold a container therebetween;
   protective covers being removably connectable to said transport compartment arms;
   each of said protective covers comprising a protective body configured to cover a container contact portion of said transport compartment arms to protect containers held by said transport compartment arms from damage caused by contact with said transport compartment arms;
   each of said protective covers comprising at least one connecting element being configured to removably connect said protective covers to said transport compartment arms; and
   said at least one connecting element being integrally formed as a one-piece structure with said protective body each of said protective covers being replaceable without using tools.

2. The rotary container handling arrangement according to claim 1, wherein said at least one connecting element forms a non-positive and/or positive fit connection between said transport compartment arm and said protective body.

3. The rotary container handling arrangement according to claim 2, wherein the positive connection is formed in a direction transverse to the longitudinal axis of said protective body.

4. The rotary container handling arrangement according to claim 3, wherein the non-positive connection is formed in the longitudinal axis direction of said protective body.

5. The rotary container handling arrangement according to claim 4, wherein an engagement device for the positive connection of said protective body is arranged in the longitudinal axis direction.

6. The rotary container handling arrangement according to claim 5, wherein said engagement device comprises an engagement body and an engagement body receiver.

7. The rotary container handling arrangement according to claim 6, wherein said rotary container handling arrangement further comprises a positioning device, which comprises a positioning stop formed such as to correspond to a positioning body.

8. The rotary container handling arrangement according to claim 7, wherein a connecting web is arranged for the secure location positioning of said at least one connecting element.

9. The rotary container handling arrangement according to claim 8, wherein said rotary container handling arrangement further comprises a stop arranged at said transport compartment for the secure location positioning of said protective body at said transport compartment.

10. The rotary container handling arrangement according to claim 9, wherein two of said container protective covers are arranged at each said transport compartment.

11. The rotary container handling arrangement according to claim 10, wherein said protective body is formed from plastic.

12. The rotary container handling arrangement according to claim 1, wherein an engagement device for a positive connection of said protective body is arranged in the longitudinal axis direction.

13. The rotary container handling arrangement according to claim 12, wherein said engagement device comprises an engagement body and an engagement body receiver.

14. The rotary container handling arrangement according to claim 1, wherein said rotary container handling arrangement further comprises a positioning device, which comprises a positioning stop formed such as to correspond to a positioning body.

15. The rotary container handling arrangement according to claim 1, wherein a connecting web is arranged for the secure location positioning of said at least one connecting element.

16. The rotary container handling arrangement according to claim 1, wherein said rotary container handling arrangement further comprises a stop arranged at said transport compartment for the secure location positioning of said protective body at said transport compartment.

17. The rotary container handling arrangement according to claim 1, wherein said protective body is formed from plastic.

18. A method of protecting containers comprising glass bottles, plastic bottles, and cans, in a rotary container handling arrangement for handling containers, said method comprising:
   moving containers into transport compartments of a rotatable carousel;
   holding containers between transport compartment arms of said transport compartments while rotating said rotatable carousel;
   protecting containers held by said transport compartment arms from damage, caused by contact with said transport compartment arms, using protective covers removably connected to said transport compartment arms;
   removing worn or damaged protective covers without using tools by disconnecting from each transport compartment arm at least one connecting element integrally formed as a one-piece structure with said protective body; and
   replacing said worn or damaged protective covers with new protective covers without using tools by connecting said at least one connecting element of each of said new protective covers to a corresponding transport compartment arm.

19. The method according to claim 18, wherein said step of connecting said protective covers comprises sliding an opening in said protective cover over a free end of said transport compartment arm, and then rotating or pivoting said protective cover about said free end, and then pushing said at least one connecting element into engagement with a base end of said transport compartment arm.

* * * * *